(12) United States Patent
Funk et al.

(10) Patent No.: US 12,012,886 B1
(45) Date of Patent: Jun. 18, 2024

(54) DOSING CONTROL AND PASSIVE REGENERATION COORDINATION WITH DIAGNOSTIC

(71) Applicant: GM GLOBAL TECHNOLOGY OPERATIONS LLC, Detroit, MI (US)

(72) Inventors: Sarah Funk, Canton, MI (US); David P Quigley, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 18/156,077

(22) Filed: Jan. 18, 2023

(51) Int. Cl.
*F01N 3/035* (2006.01)
*F01N 3/20* (2006.01)
*F01N 11/00* (2006.01)

(52) U.S. Cl.
CPC ............ *F01N 3/208* (2013.01); *F01N 3/035* (2013.01); *F01N 11/00* (2013.01); *F01N 2550/05* (2013.01); *F01N 2560/021* (2013.01); *F01N 2560/026* (2013.01)

(58) Field of Classification Search
CPC .......... F01N 3/021; F01N 3/035; F01N 3/208; F01N 2610/02; F01N 2550/05; F01N 2560/021; F01N 2560/026; F01N 11/00
See application file for complete search history.

(56) References Cited

U.S. PATENT DOCUMENTS

2006/0086080 A1* 4/2006 Katogi .................... F01N 9/007
60/278
2011/0167805 A1* 7/2011 Chen ....................... F01N 3/208
60/286

FOREIGN PATENT DOCUMENTS

JP 2013-253540 * 12/2013
JP 2016-160855 * 9/2016

* cited by examiner

*Primary Examiner* — Phutthiwat Wongwian
*Assistant Examiner* — Diem T Tran
(74) *Attorney, Agent, or Firm* — Lorenz & Kopf LLP

(57) ABSTRACT

Methods and systems for controlling treatment of exhaust in a emission control system of a platform having a combustion system is provided. In an exemplary embodiment, the method includes estimating, via a processor, an amount of soot in exhaust from the combustion system; and controlling, via the processor, treatment of the exhaust based on the amount of soot in the exhaust.

20 Claims, 2 Drawing Sheets

DOSING CONTROL AND PASSIVE REGENERATION COORDINATION WITH DIAGNOSTIC

INTRODUCTION

The technical field generally relates to the field of control of exhaust treatment for platforms, such as vehicles.

Various vehicles and other platforms today have systems for treatment of exhaust from an engine or other combustion system. However, existing techniques may not always provide optimal treatment of the exhaust and/or diagnostics of the system under certain conditions.

Accordingly, it is desirable to provide systems and methods for controlling of exhaust treatment, such as for vehicles or other platforms. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling treatment of exhaust in a emission control system of having a combustion system is provided that includes: estimating, via a processor, an amount of soot in exhaust from the combustion system; and controlling, via the processor, treatment of the exhaust based on the amount of soot in the exhaust.

Also in an exemplary embodiment, the method further includes: calculating, via the processor, a filtered soot value in the exhaust; and controlling, via the processor, the treatment of the exhaust based on the filtered soot value.

Also in an exemplary embodiment, the step of controlling the treatment of the exhaust includes selectively arbitrating reduction of NOx between selective catalyst reduction catalysts (SCR) based on the amount of soot, in accordance with instructions provided by the processor.

Also in an exemplary embodiment, the step of controlling the treatment of the exhaust includes adjusting a urea flow rate of fluid injected from an injector upstream of a front SCR of the emission control system, the front SCR being upstream of a diesel particulate filter (DPF), based on the amount of soot.

Also in an exemplary embodiment, the step of controlling the treatment of the exhaust includes: providing the fluid from the injector with an ammonia to nitrogen oxide (NOx) ratio (ANR) that is greater than one, when the amount of soot is less than a predetermined value, in accordance with instructions provided by the processor; and providing the fluid from the injector with the ANR instead being less than one, when the amount of soot is greater than or equal to the predetermined value, in accordance with instructions provided by the processor.

Also in an exemplary embodiment, the step of controlling the treatment of the exhaust further includes selectively performing diagnostics for the front SCR that is upstream of the DPF based on the amount of soot, in accordance with instructions provided by the processor.

Also in an exemplary embodiment, the step of selectively performing diagnostics for the SCR includes: selectively enabling the diagnosing of a health of the SCR when the amount of soot is less than a predetermined threshold, based on instructions provided by the processor; and selectively disabling the diagnosing of the health of the SCR when the amount of soot is greater than or equal to the predetermined threshold, based on instructions provided by the processor.

In another exemplary embodiment, a system for controlling treatment of exhaust in a emission control system of a vehicle having a combustion system is provided, the system includes a nontransitory computer readable signal bearing medium that is configured to store a program, and a processor that is configured to at least facilitate estimating an amount of soot in the exhaust and controlling treatment of the exhaust based on the amount of soot in the exhaust in accordance with the program.

Also in an exemplary embodiment, the processor is further configured to at least facilitate: calculating a filtered soot value in the exhaust based on the sensor data; and controlling the treatment of the exhaust based on the filtered soot value.

Also in an exemplary embodiment, the processor is further configured to at least facilitate selectively arbitrating reduction of NOx between selective catalyst reduction catalysts (SCR) based on the amount of soot, in accordance with instructions provided by the processor.

Also in an exemplary embodiment, the processor is further configured to at least facilitate adjusting a urea flow rate of fluid injected from an injector upstream of a front SCR of the emission control system, the front SCR being upstream of a diesel particulate filter (DPF), based on the amount of soot.

Also in an exemplary embodiment, the processor is further configured to at least facilitate: providing the fluid from the injector with an ammonia to NOx ratio (ANR) that is greater than one, when the amount of soot is less than a predetermined value, in accordance with instructions provided by the processor; and providing the fluid from the injector with the ANR instead being less than one, when the amount of soot is greater than or equal to the predetermined value, in accordance with instructions provided by the processor.

Also in an exemplary embodiment, the processor is further configured to at least facilitate selectively performing diagnostics for a selective catalyst reduction catalyst (SCR) based on the amount of soot, in accordance with instructions provided by the processor.

Also in an exemplary embodiment, the processor is further configured to at least facilitate: selectively enabling the diagnosing of a health of the SCR when the amount of soot is less than a predetermined threshold, based on instructions provided by the processor; and selectively disabling the diagnosing of the health of the SCR when the amount of soot is greater than or equal to the predetermined threshold, based on instructions provided by the processor.

In another exemplary embodiment, a platform is provided that includes an emission control system and a processor. The emission control system includes a combustion system. The processor is configured to at least facilitate: estimating an amount of soot in exhaust from the combustion system; and controlling treatment of the exhaust based on the amount of soot in the exhaust from the combustion system in accordance with the program.

Also in an exemplary embodiment, the emission control system further includes a plurality of selective catalyst reduction catalysts (SCR); and the processor is further configured to at least facilitate arbitrating reduction of NOx between the SCR based on the amount of soot, in accordance with instructions provided by the processor.

Also in an exemplary embodiment, the processor is further configured to at least facilitate adjusting a urea flow rate of fluid injected from an injector upstream of a front SCR of the emission control system, the front SCR being upstream of a diesel particulate filter (DPF), based on the amount of soot.

Also in an exemplary embodiment, the processor is further configured to at least facilitate: providing the fluid from the injector with an ammonia to NOx ratio (ANR) that is greater than one, when the amount of soot is less than a predetermined value, in accordance with instructions provided by the processor; and providing the fluid from the injector with the ANR instead being less than one, when the amount of soot is greater than or equal to the predetermined value, in accordance with instructions provided by the processor.

Also in an exemplary embodiment: the emission control system further includes a selective catalyst reduction catalyst (SCR); and the processor is further configured to at least facilitate selectively performing diagnostics for the SCR based on the amount of soot, in accordance with instructions provided by the processor.

Also in an exemplary embodiment, the processor is further configured to at least facilitate: selectively enabling the diagnosing of a health of the SCR when the amount of soot is less than a predetermined threshold, based on instructions provided by the processor; and selectively disabling the diagnosing of the health of the SCR when the amount of soot is greater than or equal to the predetermined threshold, based on instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
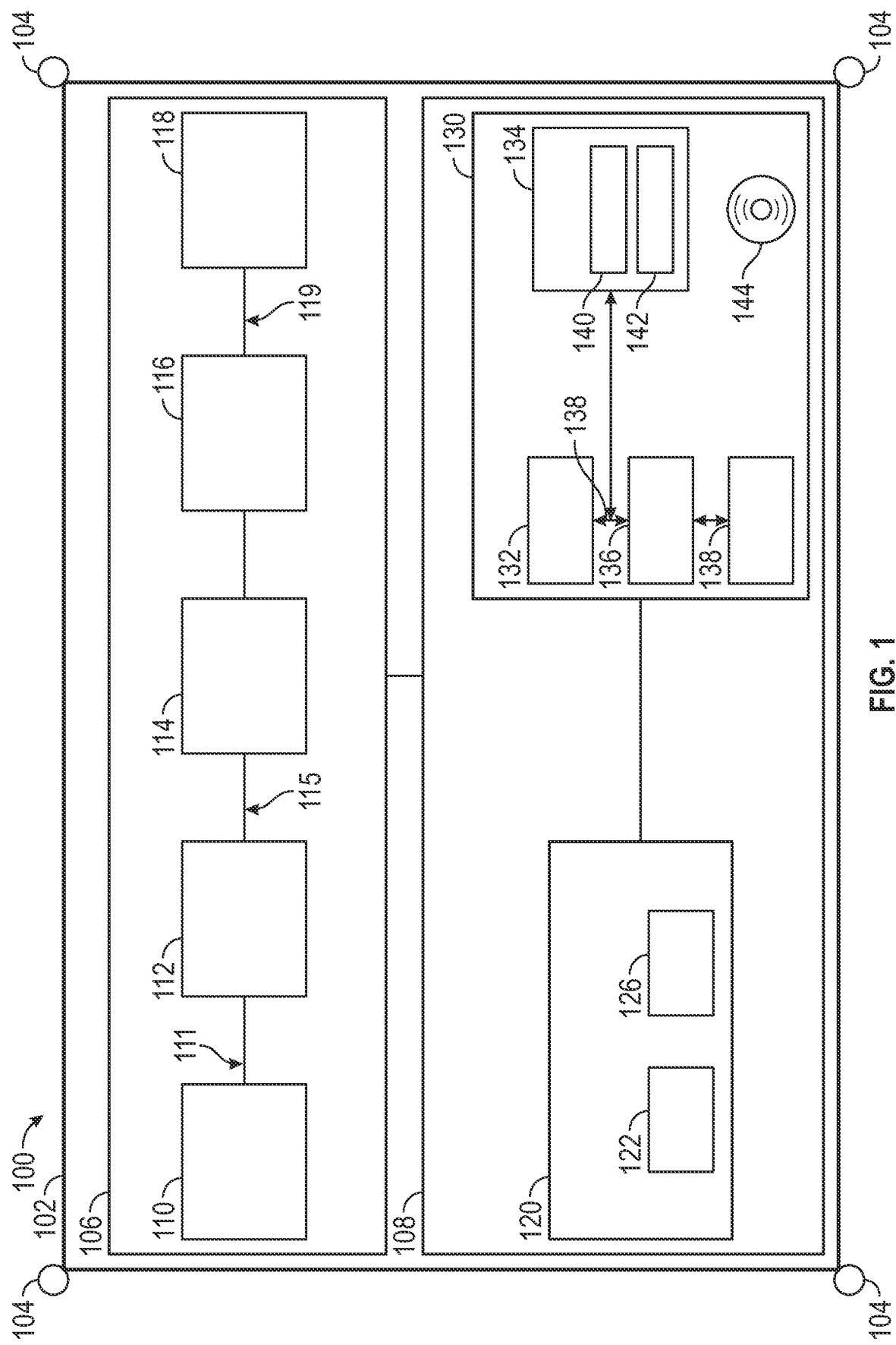
FIG. 1 is a functional block diagram of a platforms, such as a vehicle, having an emission control system that includes a combustion system, such as an engine, as well as a controller for treating exhaust from the combustion system, in accordance with an exemplary embodiment.
Figure 2:
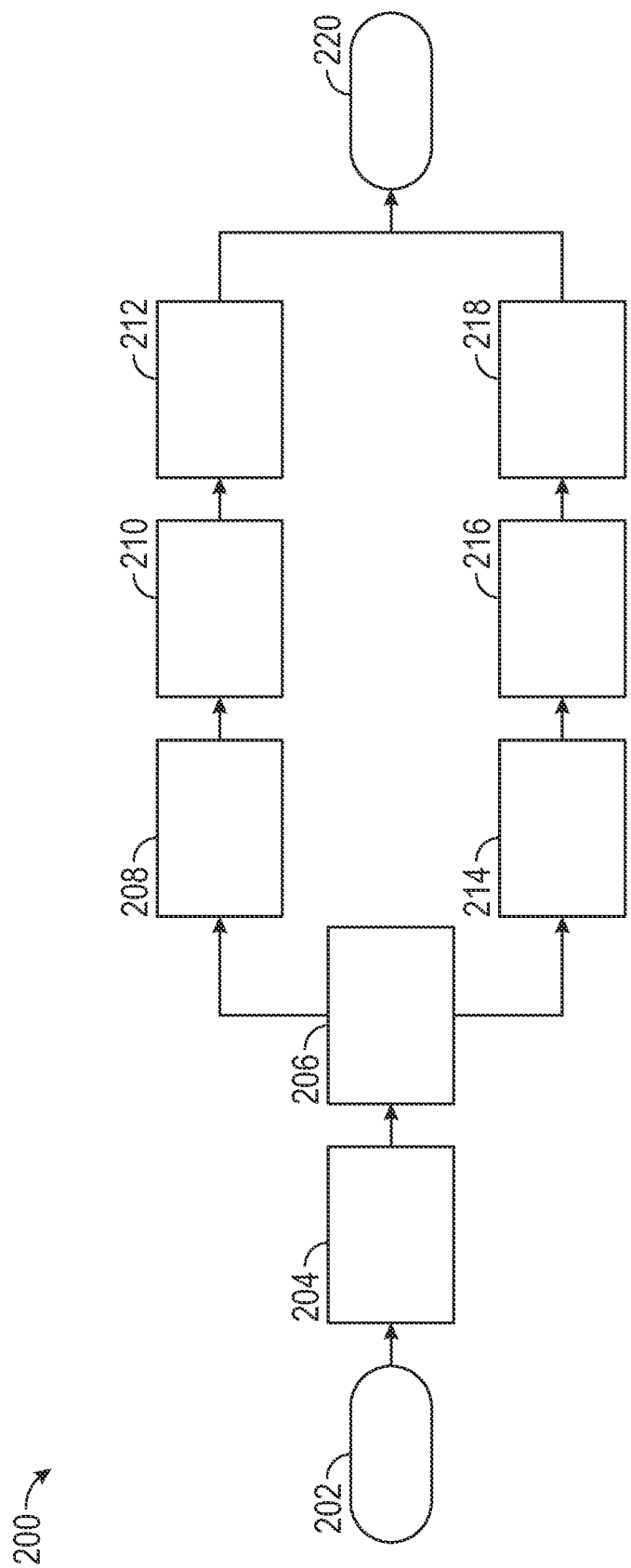
FIG. 2 is a flowchart of a process for controlling treatment of exhaust, and that can be implemented in connection with the platform of FIG. 1, including the emission control system and controller thereof, in accordance with an exemplary embodiment.

FIG. 1 illustrates a platform 100, according to an exemplary embodiment. As described in greater detail further below, the platform 100 comprises a control system 108 for controlling combustion system exhaust for the platform 100, in accordance with the steps of the process that is depicted in FIG. 2 and described further below in connection therewith.

In various embodiments, the platform 100 includes a body 102, one or more wheels 104, and a emission control system 106, in addition to the control system 108 noted above.

In certain embodiments, the platform 100 comprises a vehicle, such as an automobile. In various embodiments, the platform 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the platform 100 may also comprise a motorcycle and/or one or more other types of vehicles. In addition, in various embodiments, it will also be appreciated that the platform 100 may comprise any number of other types of vehicles, and/or any one of a number of different types of mobile platforms and/or other platforms.

In the depicted embodiment, the platform 100 includes a body 102 that substantially encloses other components of the platform 100. Also in the depicted embodiment, the platform 100 includes one or more wheels 104. In various embodiments, the wheels 104 are each rotationally coupled to one or more of the axles (not depicted) near a respective corner of the body 102 to facilitate movement of the platform 100. In one embodiment, the platform 100 includes four wheels 104, although this may vary in other embodiments (for example for trucks and certain other vehicles).

In various embodiments, the emission control system 106 includes one or more combustion systems 110 (e.g., engines, in certain embodiments), along with diesel oxidation catalysts (DOC) 112, selective catalyst reduction catalysts (SCR) 114, 118, and diesel particulate filters (DPF) 116.

In various embodiments, the combustion system 110 comprises a diesel engine that drives the wheels 104 for propulsion of the platform 100, including the body 102 thereof. In various embodiments, the combustion system 110 includes an outlet 111 through which exhaust exits the combustion system 110 and flows through the remainder of the emission control system 106.

Also in various embodiments, the DOC 112 is coupled to the combustion system 110, proximate the outlet 111. In various embodiments, the DOC 112 is close-coupled to the combustion system 110. In various embodiments, the DOC 112 is connected to the outlet 111 of the combustion system 110. In various embodiments, the DOC 112 receives exhaust from the combustion system 110 via the outlet 111, and converts carbon monoxide and hydrocarbons into carbon dioxide and water. While a single DOC 112 is depicted, it will be appreciated that the number of DOC 112 devices may vary in other embodiments.

In various embodiments, the DPF 116 filters particles (including carbon matter and/or soot) from the combustion system exhaust.

In various embodiments, the SCR 114, 118 reduce nitrogen oxides (NOx) in the exhaust. Also in various embodiments, each SCR 114, 118 is coupled to a respective injector 115, 119. In various embodiments, injectors 115 and 119 inject diesel exhaust fluid into the exhaust stream upstream of the SCR 114, 118. In certain embodiments, the diesel exhaust fluid (DEF) is a solution of water and urea where the concentration of urea is approximately thirty two and one half percent (~32.5%), for example as specified by ISO standards. Also in various embodiments, the DEF decomposes to ammonia by chemical reactions once injected into the exhaust stream. Also in various embodiments, the flow rate of DEF injection is varied by the control system 108 to meet the requested quantity of NH3 needed for Nox reduction reactions in the SCR 114, 118.

Also in various embodiments, the front SCR 114 can help selectively facilitate passive regeneration of soot by at appropriate times by operating at decreased efficiency and thus passing more unreacted NO2 to the DPF 116 (e.g., in various embodiments, because NO2 is the oxidant for soot in passive regeneration).

As depicted in in FIG. 1, in various embodiments emission control system 106 includes multiple diesel/exhaust fluid (DEF) SCR aftertreatment systems 114, 118 with a particulate filter DPF 116 between. Also in various embodiments, the dosing control and diagnostic strategies for the control system 108 and the process 200 of FIG. 2 (described below) are with respect to the front SCR 114. This contrasts with other technologies, which for example control the downstream SCR 118 based on output from the front SCR 114.

Also as depicted in FIG. 1, in one exemplary embodiment the front SCR 114 is upstream of the DPF 116, while the rear SCR 118 is downstream of the DPF 116. In addition, as described in greater detail further below in connection with the control system 108 and the process 200 of FIG. 2, in an exemplary embodiment the control strategy is to limit dosing (low ammonia to NOx ratio or ANR) to the front SCR 114 to increase NO2 feedgas to the DPF 116 to allow for passive regeneration of the DPF 116. The SCR diagnostic strategy uses estimated NH3 storage capacity to determine if the SCR is failed. If the front SCR continuously operates at low NH3 storage, the diagnostic strategy will no longer be robust. A means to coordinate NH3 loading of the front SCR and ability to passively regenerate, along with diagnostic enablement is required.

In various embodiments, the control system 108 is coupled to the emission control system 106, and provides instructions for controlling the treatment of exhaust from the combustion system 110. In various embodiments, the control system 108 controls the ratio or proportion of ammonia to NOx for the diesel exhaust fluid via one or more of the injectors 115, 119 to one or more of the SCR 114, 118. In addition, in certain embodiments, the control system 108 controls diagnostics for one or more of the SCR 114, 118, among other features pertaining to the platform 100 and the emission control system 106 thereof. In various embodiments, the control system 108 provides these functions as described further below in connection with the process 200 of FIG. 2.

As depicted in FIG. 1, in various embodiments, the control system 108 includes a sensor array 120 and a controller 130.

In various embodiments, the sensor array 120 includes various sensors for obtaining sensor data pertaining to the combustion system 110, the emission control system 106, and/or the platform 100 in general. As depicted in FIG. 1, in various embodiments, the sensor array 120 includes one or more NOx sensors 122, and in certain embodiments may also include one or more other sensors 126.

In various embodiments, the one or more NOx sensors 122 obtain sensor data pertaining to an amount or concentration of NOx in the combustion system exhaust. In various embodiments, the NOx sensors 122 measure an amount or concentration of NOx at one or more locations of the emission control system 106, including as the exhaust enters and exits the SCR 114, 118.

Also in various embodiments, the one or more other sensors 126 obtain additional sensor data, such as to the operation of the emissions control system 106 and/or components thereof and/or conditions of the emission control system 106 (e.g., temperature).

Also in various embodiments, the controller 130 comprises a computer system that is coupled to the sensor array 120 and the injectors 115, 119, and in certain embodiments also to one or more other components of the emission control system 106 and/or the platform 100 in general. In various embodiments, the controller 130 is configured to provide instructions for controlling the treatment of exhaust from the combustion system 110. In various embodiments, the controller 130 arbitrates between passive and active regeneration of the DPF 116 depending on the soot value in addition to other exhaust conditions (e.g., temperature) of the emission control system 106. In various embodiments, if the soot is relatively high, then passive regeneration is emphasized. Conversely, in various embodiments if the soot is low, then active regeneration is instead utilized. In various embodiments, passive regeneration is achieved by underutilizing the front SCR 114 so that it consumes less NO2 (e.g., because NO2 is the oxidizer for passive regeneration of soot). Accordingly, in certain embodiments, the front SCR 114 efficiency is basically turned down so that more unreacted NO2 passes through the front SCR 114 to the DPF 116.

In addition, in certain embodiments, the controller 130 controls diagnostics for one or more of the SCR 114, 118, among other features pertaining to the platform 100 and the emission control system 106 thereof.

In various embodiments, these steps are performed in conjunction with the process 200 depicted in FIG. 2 and described further below in connection therewith.

As depicted in FIG. 1, in various embodiments, the controller 130 comprises a computer system comprising a processor 132, a memory 134, an interface 136, a storage device 138, a bus 138, and a disk 146. In certain embodiments, the controller 130 may also include the sensor array 120, one or more of the other systems or components thereof, and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 138. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 140 contained within the memory 134 and, as such, controls the general operation of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 140 along with one or more stored values 142 (e.g., including, in various embodiments, predetermined threshold values for controlling emissions of the emission control system 106).

The bus 138 serves to transmit programs, data, status and other information or signals between the various components of the controller 130. The interface 136 allows communications to the controller 130, for example from a system driver and/or another computer system, and can be implemented using any suitable method and apparatus. In one embodiment, the interface 136 obtains the various data from the sensor array 120, the emission control system 106, and/or one or more other components and/or systems of the platform 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 140 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 138 can be any suitable physical or logical means of connecting computer systems and components. This includes, but is not limited to, direct hard-wired connections, fiber optics, infrared and wireless bus technologies. During operation, the program 140 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the controller 130 may also otherwise differ from the embodiment depicted in FIG. 1, for example in that the controller 130 may be coupled to or may otherwise utilize one or more remote computer systems and/or other control systems.

FIG. 2 is a flowchart of a process 200 for controlling treatment of exhaust from a combustion system (e.g., of an engine of a vehicle). In various embodiments, the process 200 may be implemented in connection with the platform 100 of FIG. 1, including the emission control system 106 and control system 108 thereof.

As depicted in FIG. 2, in various embodiments the process 200 begins at 202. In certain embodiments, the process 200 begins when one or more events occur to indicate that a combustion system (such as an engine and/or other combustion system 110 of FIG. 1) is starting and/or operating. In various embodiments, the steps of the process 200 continue, preferably continually, so long as the combustion system 110 is operating.

Data is collected at 204. In various embodiments, sensor data is collected from various sensors of the sensor array 120 of FIG. 1, such as NOx data is obtained via the NOx sensors 122 as to an amount or concentration of NOx in the emission control system 106. In various embodiments, the NOx data is obtained from multiple NOx sensors 122 that are disposed before and after one or more of the SCR 114, 118 of FIG. 1, so as to detect differentials in NOx amounts or concentrations as the exhaust flows through the one or more SCR 114, 118. In various embodiments, additional data may also be obtained, including as to the operation of the emission control system 106 and/or components thereof.

In various embodiments, a soot value is determined (step 206). In various embodiments, the soot value of step 206 represents a soot amount or concentration for the emission control system 106 of FIG. 1 that is exiting the combustion system 110 of FIG. 1, as determined based on the data of step 204 and/or from other determinations of the processor 132 of FIG. 1. In certain embodiments, the soot value of step 206 represents a filtered soot value, such as an average value (such as an arithmetic mean) of different soot values, and/or one or more other types of filtered values of the soot value as estimated or determined via the processor 132. In certain embodiments, the filtered value is calculated by the processor 132 of FIG. 1 using the different estimated soot values.

Also in various embodiments, a determination (e.g., as part of step 208) is made as to whether the soot value (e.g., the filtered soot value) is less than a predetermined threshold. In various embodiments, this determination is also made by the processor 132 of FIG. 1 using a predetermined value that has been stored in the memory 134 of FIG. 1 as one of the stored values 142 therein.

In various embodiments, if it is determined that the soot value is less than the predetermined threshold, then the process proceeds to step 210. During step 210, the dosing control is weighted toward the one or more front SCR 114 of FIG. 1. In various embodiments, this is implemented via the processor 132 of FIG. 1.

In various embodiments, ammonia dosing is consequently increased (step 210). In various embodiments, an elevated ratio of ammonia to NOx is utilized in step 210. In various embodiments, the injector 115 of FIG. 1 provides the elevated ratio of ammonia to NOx for the front SCR 114 of FIG. 1, so that an ammonia to NOx ratio (ANR) is greater than one for the DEF injected into the exhaust upstream of the front SCR 114. In various embodiments, this is performed in accordance with instructions provided by the processor 132 of FIG. 1 that are implemented via the injector 115.

Also in various embodiments, diagnostics are enabled for the SCR 114 (step 212). In various embodiments, the processor 132 of FIG. 1 provide instructions for enabling of diagnostics for the front SCR 114 of FIG. 1 based on the NOx data obtained via the NOx sensors 122 of FIG. 1. In certain embodiments, the diagnostics are performed by the processor 132 of FIG. 1 in evaluating the performance and/or health of the front SCR 114. In various embodiments, as the amount of soot in the combustion system exhaust is relatively low and because the ANR is greater than one dosing conditions for the SCR 114 are at higher efficiency, the differences in measured NOx values for the SCR 114 are considered to be likely to have sufficient variability for the processor 132 to successfully differentiate between a healthy and properly functioning SCR 114 as compared with an SCR 114 that may be unhealthy or not functioning properly.

In various embodiments, the process either continues (e.g., with obtaining new or updated soot value in a new iteration of step 204) and/or terminates (e.g., once the combustion system is turned off or the current ignition cycle or vehicle drive is completed) at step 220.

Conversely, and with reference back to step 206, in various embodiments if it is instead determined that the soot value is greater than or equal to the predetermined threshold, then the process proceeds instead to step 216. During step 216, the dosing control is weighted away from active SCR regeneration and toward passive SCR regeneration.

In various embodiments, ammonia dosing is consequently decreased (step 216). In various embodiments, a reduced ratio of ammonia to NOx is utilized in step 216. In various embodiments, the injector 115 of FIG. 1 supplies the reduced ratio of ammonia to NOx for the front SCR 114 of FIG. 1, so that an ammonia to NOx ratio (ANR) is less than one for the DEF injected into the exhaust upstream of the front SCR 114. In various embodiments, this is performed in accordance with instructions provided by the processor 132 of FIG. 1 that are implemented via the injector 115.

Also in various embodiments, diagnostics are disabled for the SCR (step 218). In various embodiments, the processor 132 of FIG. 1 provide instructions for disabling of diagnostics for the front SCR 114 of FIG. 1 (e.g., so that the diagnostics of step 212 are not currently being performed). In various embodiments, the diagnostics are disabled because the ANR is less than one, so that the differences between recorded NOx levels of healthy versus faulty SCR 114 may not be sufficient for the processor 132 of FIG. 1 to effectively differentiate between the healthy versus faulty SCR 114.

In various embodiments, the process either continues (e.g., with obtaining new or updated soot values in a new iteration of step 204) and/or terminates (e.g., in the case of a vehicle with an engine, once the engine is turned off or the current ignition cycle or vehicle drive is completed, or in the case of another platform, once the platform is turned off or a particular cycle is completed, or the like) at step 220.

Accordingly, methods, systems, and vehicles are provided for control of treatment of emissions from combustion systems, such as engines. As described in greater detail above, in various embodiments, a soot amount or concentration of combustion system exhaust in the emission control system 106 is analyzed from exhaust from the combustion system, and is utilized in controlling the urea flow rate of DEF injected into the exhaust upstream of one or more front SCR 114 of FIG. 1, and in selectively emphasizing active regeneration versus passive regeneration. Also in various embodiments, the soot amount or concentration from the exhaust is also utilized in selective enablement and disabling of the performing of diagnostics for the front SCR 114.

It will be appreciated that the systems, applications, and implementations may vary from those depicted in the Figures and described herein. For example, in various embodiments, the platform 100, emission control system 106, controller, components thereof, and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIG. 2 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling treatment of exhaust in an emission control system having a combustion system comprising a diesel engine, one diesel oxidation catalyst (DOC), one diesel particulate filter (DPF) disposed downstream of the diesel oxidation catalyst, a first selective catalyst reduction catalyst (SCR) disposed between the DOC and the DPF, downstream of the DOC and upstream of the DPF, and a second selective reduction catalyst (SCR) disposed downstream of the DPF, the method comprising:
estimating, via a processor, an amount of soot in exhaust from the combustion system based on sensor data; and
controlling, via the processor, treatment of the exhaust based on the amount of soot in the exhaust, wherein the controlling is performed by:
when the amount of soot is less than a predetermined threshold, increasing an ammonia dosing from an injector upstream of the first SCR, to thereby provide an ammonia to NOx ratio for the first SCR to be greater than one, and to thereby weight the ammonia dosing control toward active DPF regeneration; and
when the amount of soot is great greater than the predetermined threshold, decreasing ammonia dosing for the first SCR, to thereby decrease the ammonia to NOx ratio for the first SCR to be less than one to increase $NO_2$ feed gas to the DPF, and to thereby weight the ammonia dosing control toward passive DPF regeneration.

2. The method of claim 1, further comprising:
calculating, via the processor, a filtered soot value in the exhaust; and
controlling, via the processor, the treatment of the exhaust based on the filtered soot value.

3. The method of claim 1, wherein the step of controlling the treatment of the exhaust comprises selectively arbitrating reduction of NOx between the first and second selective catalyst reduction catalysts (SCR), in accordance with instructions provided by the processor.

4. The method of claim 3, wherein the step of controlling the treatment of the exhaust comprises adjusting a urea flow rate of fluid injected from the injector upstream of the first SCR of the emission control system, based on the amount of soot.

5. The method of claim 4, wherein the step of controlling the treatment of the exhaust comprises:
providing the fluid from the injector with an ammonia to nitrogen oxide (NOx) ratio (ANR) that is greater than one, when the amount of soot is less than a predetermined value, in accordance with instructions provided by the processor; and
providing the fluid from the injector with the ANR instead being less than one, when the amount of soot is greater than or equal to the predetermined value, in accordance with instructions provided by the processor.

6. The method of claim 1, wherein the step of controlling the treatment of the exhaust further comprises selectively performing diagnostics for the first selective catalyst reduction catalyst (SCR) based on the amount of soot, in accordance with instructions provided by the processor.

7. The method of claim 6, wherein the step of selectively performing diagnostics for the first SCR comprises:
   selectively enabling the diagnosing of a health of the first SCR when the amount of soot is less than a predetermined threshold, based on instructions provided by the processor; and
   selectively disabling the diagnosing of the health of the first SCR when the amount of soot is greater than or equal to the predetermined threshold, based on instructions provided by the processor.

8. A system for controlling treatment of exhaust in an emission control system of a vehicle having a combustion system comprising a diesel engine, one diesel oxidation catalyst (DOC), one diesel particulate filter (DPF) disposed downstream of the diesel oxidation catalyst, a first selective catalyst reduction catalyst (SCR) disposed between the DOC and the DPF, downstream of the DOC and upstream of the DPF, and a second selective reduction catalyst (SCR) disposed downstream of the DPF, the system comprising:
   a nontransitory computer readable signal bearing medium that is configured to store a program; and
   a processor that is configured to at least facilitate:
      estimating an amount of soot in exhaust from the combustion system based on sensor data; and
      controlling treatment of the exhaust based on the amount of soot in the exhaust from the combustion system in accordance with the program, wherein the controlling is performed by:
         when the amount of soot is less than a predetermined threshold, increasing an ammonia dosing from an injector upstream of the first SCR, to thereby provide an ammonia to NOx ratio for the first SCR to be greater than one, and to thereby weight the ammonia dosing control toward active DPF regeneration; and
         when the amount of soot is greater than the predetermined threshold, decreasing ammonia dosing for the first SCR, to thereby decrease the ammonia to NOx ratio for the first SCR to be less than one to increase $NO_2$ feed gas to the DPF, and to thereby weight the ammonia dosing control toward passive DPF regeneration.

9. The system of claim 8, wherein the processor is further configured to at least facilitate:
   calculating a filtered soot value in the exhaust based on the sensor data; and
   controlling the treatment of the exhaust based on the filtered soot value.

10. The system of claim 8, wherein the processor is further configured to at least facilitate selectively arbitrating reduction of NOx between the first and second selective catalyst reduction catalysts (SCR), in accordance with instructions provided by the processor.

11. The system of claim 10, wherein the processor is further configured to at least facilitate adjusting a urea flow rate of fluid injected from the injector upstream of the first SCR of the emission control system, based on the amount of soot.

12. The system of claim 11, wherein the processor is further configured to at least facilitate:
   providing the fluid from the injector with an ammonia to NOx ratio (ANR) that is greater than one, when the amount of soot is less than a predetermined value, in accordance with instructions provided by the processor; and
   providing the fluid from the injector with the ANR instead being less than one, when the amount of soot is greater than or equal to the predetermined value, in accordance with instructions provided by the processor.

13. The system of claim 8, wherein the processor is further configured to at least facilitate selectively performing diagnostics for the first selective catalyst reduction catalyst (SCR) based on the amount of soot, in accordance with instructions provided by the processor.

14. The system of claim 13, wherein the processor is further configured to at least facilitate:
   selectively enabling the diagnosing of a health of the first SCR based on a comparison of NOx levels for the first SCR when the amount of soot is less than a predetermined threshold, based on instructions provided by the processor; and
   selectively disabling the diagnosing of the health of the first SCR when the amount of soot is greater than or equal to the predetermined threshold, based on instructions provided by the processor.

15. A platform comprising:
   an emission control system comprising:
   a combustion system comprising a diesel engine;
   one diesel oxidation catalyst (DOC);
   one diesel particulate filter (DPF) disposed downstream of the diesel oxidation catalyst;
   a first selective catalyst reduction catalyst (SCR) disposed between the DOC and the DPF, downstream of the DOC and upstream of the DPF;
   a second selective reduction catalyst (SCR) disposed downstream of the DPF; and
   a controller coupled to the emission control system, the controller comprising:
   one or more nitrogen oxide (NOx) sensors configured to obtain a sensor data as to nitrogen oxide in the emission control system; and
   a processor that is configured to at least facilitate:
      estimating an amount of soot in exhaust from the combustion system based on the sensor data; and
      controlling treatment of the exhaust based on the amount of soot in the exhaust from the combustion system in accordance with the program, wherein the controlling is performed by:
         when the amount of soot is less than a predetermined threshold, increasing an ammonia dosing from an injector upstream of the first SCR, to thereby provide an ammonia to NOx ratio for the first SCR to be greater than one, and to thereby weight the ammonia dosing control toward active DPF regeneration; and
         when the amount of soot is greater than the predetermined threshold, decreasing ammonia dosing for the first SCR, to thereby decrease the ammonia to NOx ratio for the first SCR to be less than one to increase $NO_2$ feed gas to the DPF, and to thereby weight the ammonia dosing control toward passive DPF regeneration.

16. The platform of claim 15, wherein:
   the processor is further configured to at least facilitate arbitrating reduction of NOx between the SCR based on the amount of soot, in accordance with instructions provided by the processor.

17. The platform of claim 16, wherein the processor is further configured to at least facilitate adjusting a urea flow rate of fluid injected from the injector upstream of the first SCR of the emission control system, based on the amount of soot.

18. The platform of claim 17, wherein the processor is further configured to at least facilitate:
   providing the fluid from the injector with an ammonia to NOx ratio (ANR) that is greater than one, when the amount of soot is less than a predetermined value, in accordance with instructions provided by the processor; and providing the fluid from the injector with the ANR instead being less than one, when the amount of soot is greater than or equal to the predetermined value, in accordance with instructions provided by the processor.

19. The platform of claim 15, wherein:
the processor is further configured to at least facilitate selectively performing diagnostics for the first SCR based on the amount of soot, in accordance with instructions provided by the processor.

20. The platform of claim 19, wherein the processor is further configured to at least facilitate:
selectively enabling the diagnosing of a health of the first SCR when the amount of soot is less than a predetermined threshold, based on instructions provided by the processor; and
selectively disabling the diagnosing of the health of the first SCR when the amount of soot is greater than or equal to the predetermined threshold, based on instructions provided by the processor.

* * * * *